Feb. 21, 1967

L. KRAMER ET AL 3,304,746

TORQUE CONTROL DEVICE

Filed Feb. 1, 1965

INVENTORS
LEO KRAMER
ROBERT P. GILLIS
BY
ATTORNEY

INVENTORS
LEO KRAMER
ROBERT P. GILLIS

Feb. 21, 1967   L. KRAMER ET AL   3,304,746
TORQUE CONTROL DEVICE
Filed Feb. 1, 1965   5 Sheets-Sheet 5

INVENTORS
LEO KRAMER
ROBERT P. GILLIS
BY
ATTORNEY

3,304,746
TORQUE CONTROL DEVICE
Leo Kramer, Chester, and Robert P. Gillis, Somerville, N.J., assignors to Ingersoll-Rand Company, New York, N.Y., a corporation of New Jersey
Filed Feb. 1, 1965, Ser. No. 429,307
10 Claims. (Cl. 64—26)

This invention relates to impllse tools and more particularly to an improved pressure control device for such impulse tools.

Heretofore, pressure control devices have been of the type disclosed in:

U.S. Patent No.:                                    Inventor
 1,996,341, issued April 2, 1935 _ J. McClelland.
 2,010,366, issued Aug 6, 1935___ B. A. Kearns.
 2,304,907, issued Dec. 15, 1942_. C. C. Goodson et al.
 2,796,789, issued June 25, 1957_ H. T. M. Rice et al.
 2,809,734, issued Oct. 15, 1957_. C. L. Graybill.
 2,986,024, issued May 30, 1961_ B. D. Power.
 3,116,617, issued Jan. 7, 1964___ D. K. Skoog.

A conventional impulse tool pressure control device such as shown in the above mentioned U.S. Patent No. 3,116,617 operates by transferring fluid from the high pressure portion of the cavity to the low pressure portion of the cavity through a restricted orifice with attendant undesirable heating of and carbonizing, burning or charring of the fluid during the continued operation of the impulse tool.

It is the general object of the present invention to avoid and overcome the foregoing and other difficulties of and objections to prior art practices by the provision of an improved pressure control device for an impulse tool which pressure control device eliminates the transfer of fluid through the pressure control device and substantially eliminates heating of the fluid and carbonizing, burning or charring of the fluid.

The aforesaid objects of the present invention, and other objects which will become apparent as the description proceeds, are achieved by providing an improved pressure control device for an impulse tool for applying torque to an object and having housing means provided with a cavity for sealingly containing a fluid. Spindle means are in the housing means and in the fluid. One of the housing means and the spindle means are rotatable relative to the other of the housing means and the spindle means, the other being adapted to engage the object. Sealing means are on one of the housing means and the spindle means. A first sealing portion is on the housing means and a second sealing portion is on the spindle means. The first sealing portion and the second sealing portion are disposed in sealing relation during a relatively small portion of each revolution of the relative rotary movement. The first sealing portion and the second sealing portion and the sealing means are operative during the relative small portion of each revolution of the relative rotary movement to dynamically seal off the cavity into a high pressure portion and a low pressure portion. The pressure control device has one of the housing means and the spindle means being provided with a cavity means in communication with the high pressure portion. Piston means are in the cavity means. Biasing means are in the cavity means for biasing the piston means into communication with the high pressure portion. The piston means is operable when the fluid pressure in the high pressure portion overcomes the force in the biasing means, to move into the cavity means to prevent further compression of the fluid and attendant increase of fluid pressure in the high pressure portion.

For a better understanding of the present invention reference should be had to the accompanying drawings, wherein like numerals of reference indicate similar parts throughout the several views and wherein.

Although the principles of the present invention are broadly applicable to fluid operated tools in general the present invention is particularly adapted for use in conjunction with an impulse tool and hence it has been so illustrated and will be so described.

Figure 1:
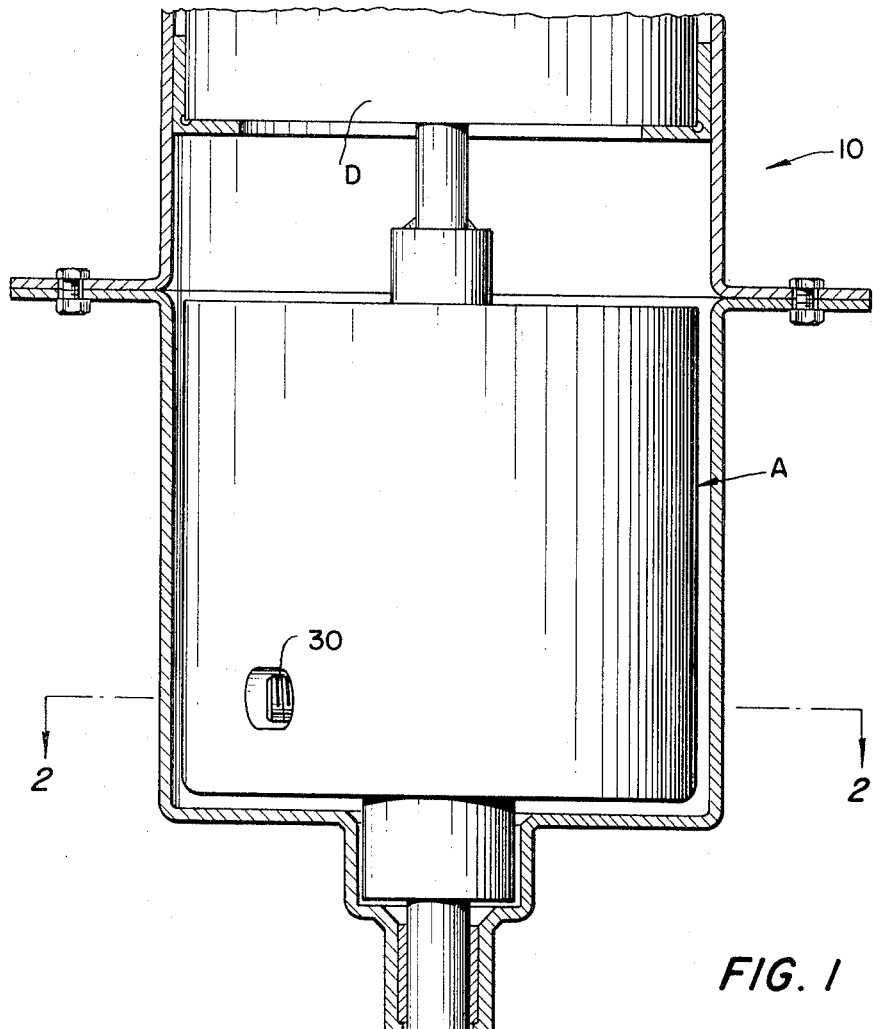
FIG. 1 is a side elevational view of an impulse tool incorporating the improved pressure control device of the present invention.
Figure 2:
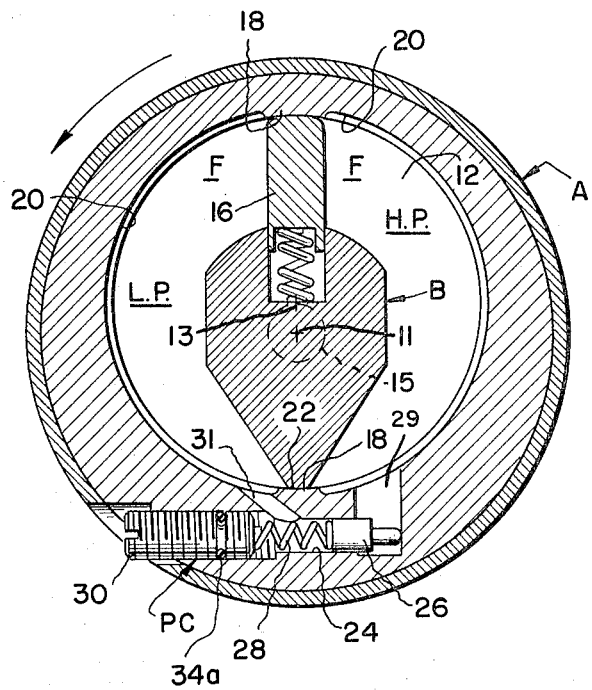
FIG. 2 is a horizontal sectional view taken along the line 2—2 of FIG. 1 in the direction of the arrows.

With specific reference to the form of the present invention illustrated in the drawings, and referring particularly to FIGS. 1, 2, an impulse tool of the type (disclosed in said above mentioned U.S. Patent No. 3,117,617) is indicated generally by the reference numeral 10.

This impulse tool 10 for applying a torque to an object, such as the nut N (FIG. 1), has housing means A (FIGS. 1, 2 having a center 11) provided with a cavity 12 (FIG. 2, having a center 13) for sealingly containing a fluid, such as oil F. Spindle means B FIGS. 1, 2 (having a shaft 15 and provided with the center 11) are disposed in the housing means A and in the oil F. Drive means, such as an air motor D (FIG. 1) or the like, are operatively associated with one of the housing means A and the spindle means B (in this case the housing means A) for causing relative rotary movement between the housing means A and the spindle means B. The other of the housing means A and the spindle means B (in this case the spindle means B) is adapted by means of a socket 14 (FIG. 1) to engage the nut N. Sealing means, such as the spindle blade 16, (FIG. 2) is disposed in one of the housing means A and spindle means B (in this case in the spindle means B). A first sealing portion, such as the lands 18 (FIG. 2) between undercuts 20 (FIG. 2) in the housing means A, is disposed on the housing means A. A second sealing portion, such as the shank portion 22 (FIG. 2) of the spindle means B, is provided.

The lands 18 and shank portion 22 are disposed in sealing relation during a relatively small portion of each revolution of said relative rotary movement. The lands 18, shank portion 22 and spindle blade 16 are operable during the relatively small portion of each revolution of the relative rotary movement to dynamically seal off the cavity 12 into a high pressure portion HP (FIG. 2) and a low pressure portion LP (FIG. 2) so that the pressure in the high pressure portion HP (and in this case on the spindle blade 16 of spindle means B) increases thereby causing the spindle means B to rotate with respect to the housing means A and to apply a torque to the nut N.

When the pressure in the high pressure portion HP reaches a predetermined value which corresponds to maxi-

PRESSURE CONTROL DEVICE mum desired torque on the nut N, the pressure control device PC (FIG. 2) of the present invention is operative.

The pressure control device PC (FIG. 2) has one of the housing means A and the spindle means B (in this case the housing means A) being provided with a cavity means, such as the bore 24 in communication with the high pressure portion HP. Piston means, such as the piston 26, are movable in the bore 24. Biasing means, such as a mechanical spring 28, are disposed in the bore 24 behind the piston 26 for biasing the piston 26 forwardly into a stop or limit position to provide the piston with a preloading force which must be overcome before it begins to retract against the spring 28. The drawings, such as FIG. 2, show the front end of the piston 26 forced against the far wall of the passage 29, interposed between the bore 24 and the high pressure portion HP of the cavity 12. Hence, the opposite wall of the passage 29 serves as a limit or stop for stopping forward movement of the piston 26 and enabling the spring 28 to be compressed to apply a preloading force on the piston 26.

The piston 26 is operable when the oil pressure in the high pressure portion HP overcomes the preloading force of the mechanical spring 28 to move into the bore 24 to prevent further compression of the oil F and attendant increase of fluid pressure in the high pressure portion HP beyond the predetermined value.

After impulse the stored energy in the high pressure portion HP and in the spring 28 is returned to the driving means (i.e. air motor D) rather than being converted into heat.

Positioning means, such as the threaded lug 30 (FIGS. 1, 2), are in the bore 24 for preloading the mechanical spring 28.

As shown in FIG. 2 vent means, such as the slot 31, communicates the bore 24 with the low pressure portion LP.

ALTERNATIVE EMBODIMENTS

Figure 3:
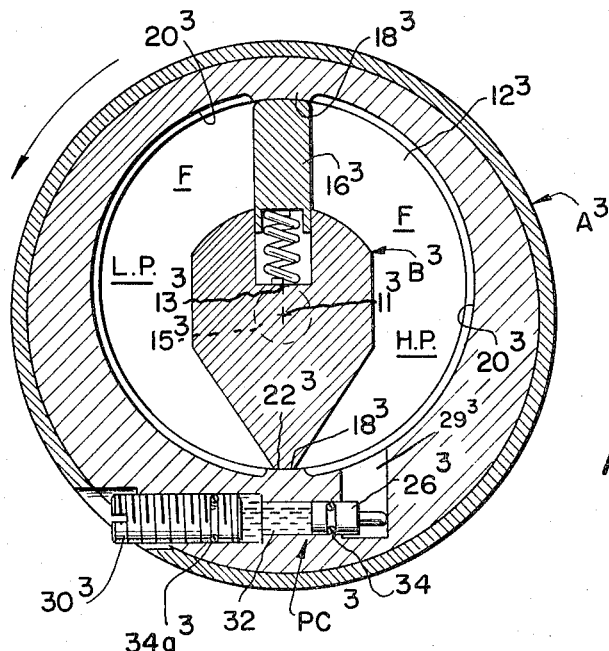
FIG. 3 is a view similar to FIG. 2 of an alternative embodiment having a fluid spring.

It will be understood by those skilled in the art that, alternatively as shown in FIG. 3, the biasing means may comprise a fluid spring and the piston $26^3$ is provided with seal means such as O-ring 34 and fluid seal 34a.

Figure 4:
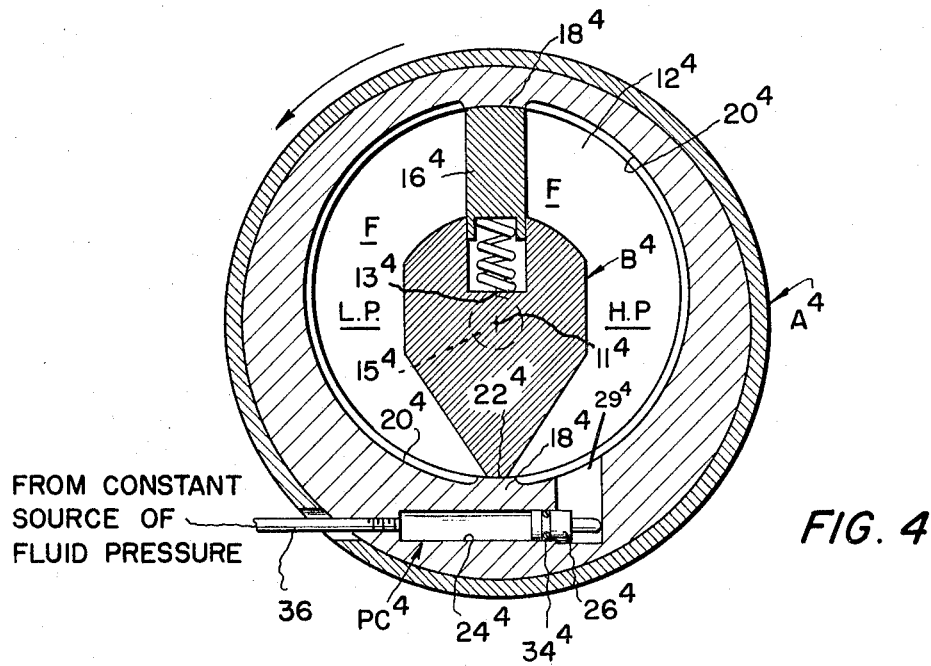
FIG. 4 is a view similar to FIGS. 2, 3, of an alternative embodiment having a fluid pressure biasing means.

In FIG. 4 the biasing means comprises a fluid pressure biasing means, such as constant source of fluid pressure, connected by a pipe 36 to the bore $24^4$.

Figure 5:
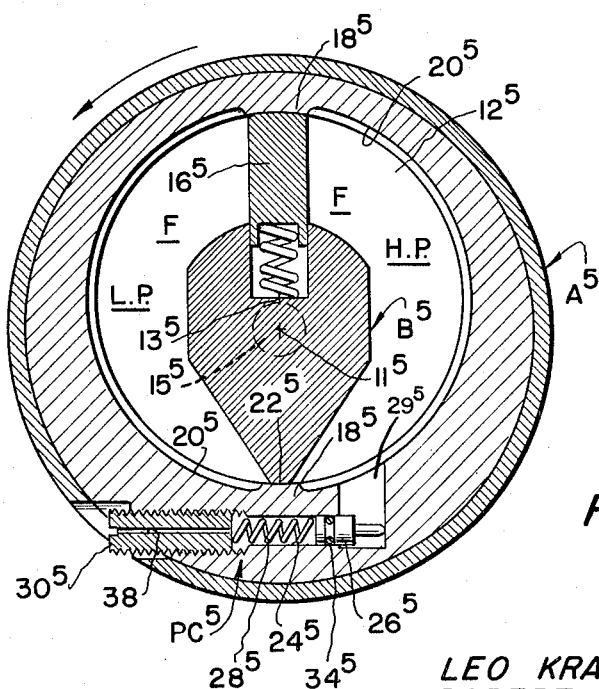
FIG. 5 is a view similar to FIGS. 2–4 of an alternative vent means connecting the bore to atmosphere.

The vent means, such as the bore 38 (FIG. 5) in the threaded lug $30^5$, connects the bore $24^5$ with the atmosphere.

Figure 7:
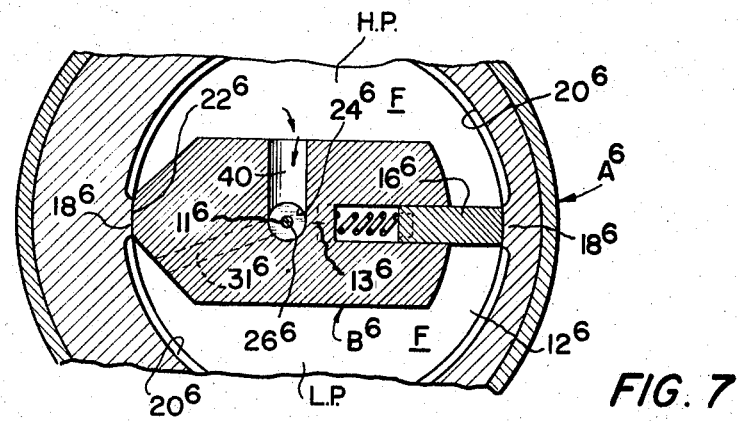
FIG. 7 is a fragmentary horizontal sectional view taken along the line 7—7 of FIG. 6 in the direction of the arrows.
Figure 6:
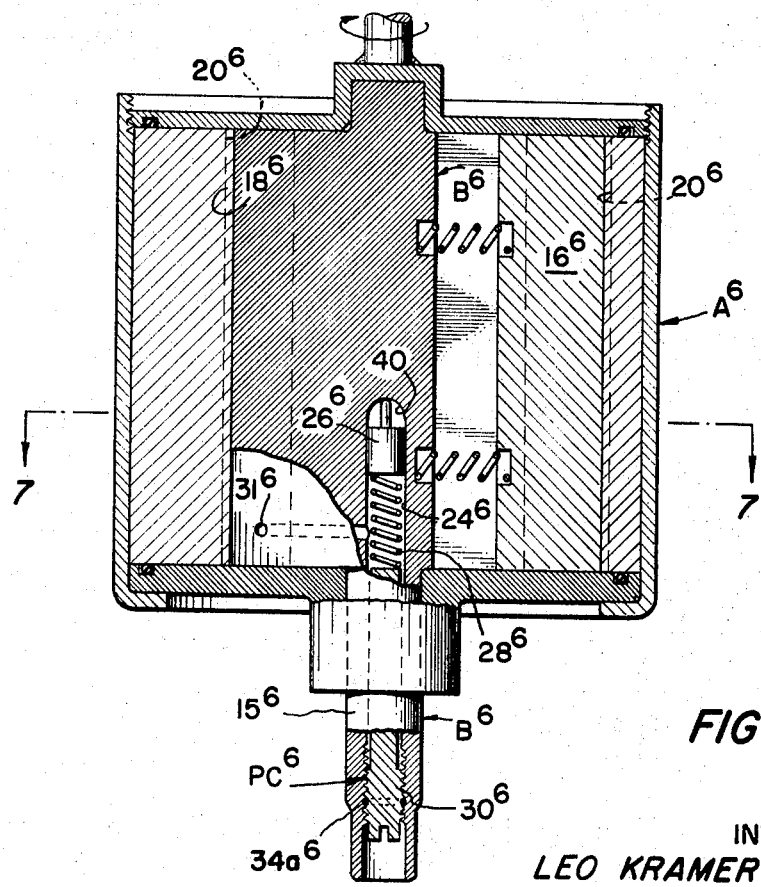
FIG. 6 is a view of an alternative embodiment similar to a vertical section of FIG. 1 showing the improved pressure control device in the spindle means.

Referring to FIGS. 6, 7 the pressure control device $PC^6$ is disposed in the spindle means $B^6$, the bore $24^6$ is connected to the high pressure portion HP by a bore 40 and the bore $24^6$ is connected to the low pressure portion LP by bore $31^6$.

Figure 9:
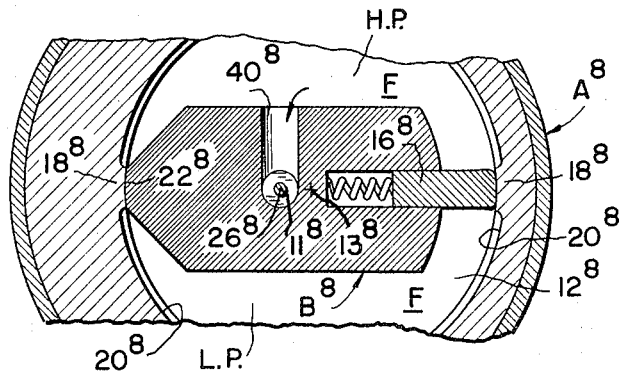
FIGS. 8, 9 are views similar to FIGS. 6, 7 respectively of an alternative embodiment wherein the pressure control device is vented to the atmosphere.
Figure 8:
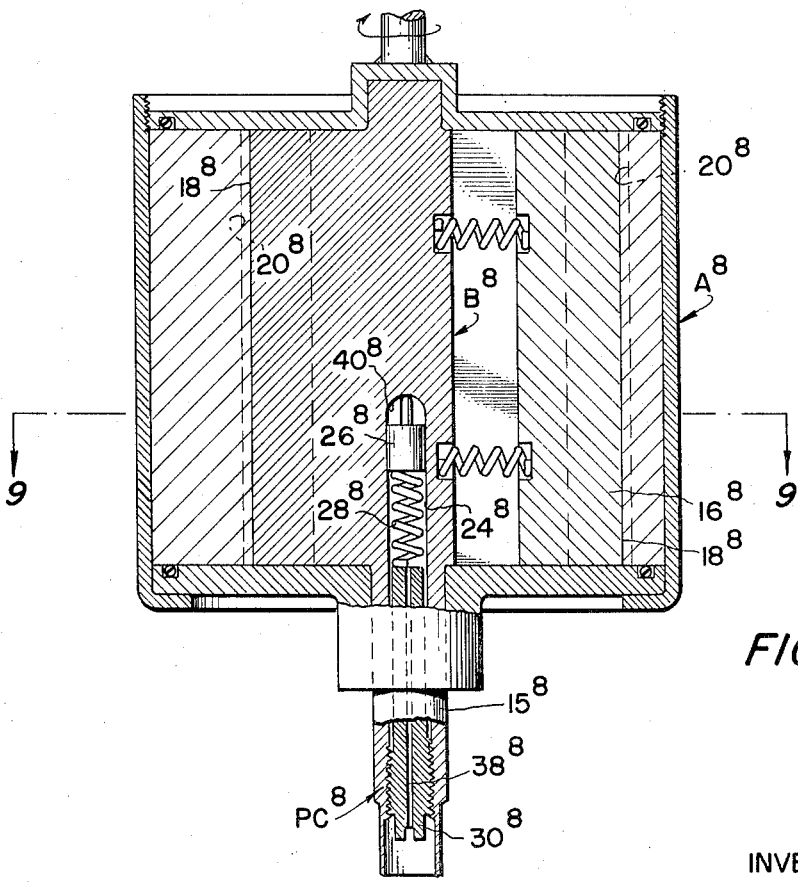

As shown in FIGS. 8, 9 the pressure control device $PC^8$ is vented to atmosphere by a bore $38^8$ in threaded lug $30^8$.

Figure 10:
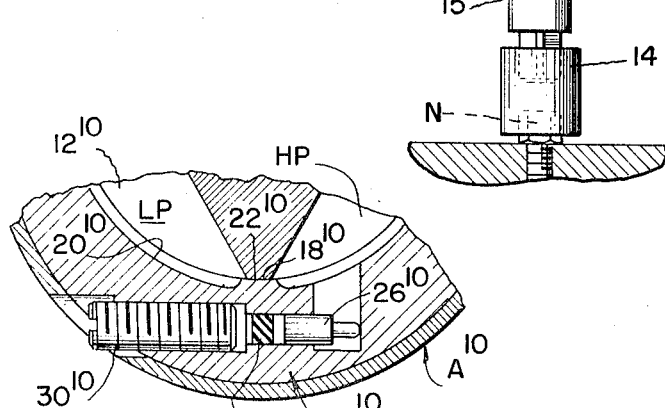
FIG. 10 is a fragmentary view similar to a portion of FIG. 5 showing a resilient member as the biasing means.

Alternatively the spring 28 of FIG. 2 may be replaced by a resilient member FIG. 10, such as rubber insert 42 or the like elastomeric polymer. It will be recognized by those skilled in the art that the objects of the present invention have been achieved by providing an improved pressure control device for an impulse tool, which pressure control device eliminates the transfer of fluid through the pressure control device and substantially eliminates the heating of the fluid and carbonizing, burning or charring of the fluid.

While in accordance with the patent statutes preferred and alternative embodiments of the present invention have been illustrated and described in detail, it is to be particularly understood that the invention is not limited thereto or thereby.

We claim:
1. For an impulse tool for applying torque to an object and having housing means provided with a cavity for sealingly containing a fluid, spindle means in said housing means and in said fluid, one of said housing means and said spindle means being rotatable relative to the other of said housing means and said spindle means, said other being adapted to engage said object, sealing means on one of said housing means and said spindle means, a first sealing portion on said housing means, a second sealing portion on said spindle means, said first sealing portion and said second sealing portion being disposed in sealing relation during a relatively small portion of each revolution of said relative rotary movement; said first sealing portion and said second sealing portion and said sealing means being operative during said relative small portion on each revolution of said relative rotary movement to dynamically seal off said cavity into a high pressure portion and a low pressure portion, a pressure control device having:
  (a) one of said housing means and said spindle means being provided with a cavity means in communication with said high pressure portion;
  (b) piston means slidably mounted in said cavity means and movable to a forward limit position in said cavity means wherein the volume of said cavity means is reduced to a minimum volume;
  (c) biasing means urging and holding said piston means forwardly in said forward limit position with a preloading force;
  (d) said piston means being operable when the fluid pressure in said high pressure portion overcomes the preloading force of said biasing means to move in the other direction in said cavity means to increase the volume of said cavity means and prevent further compression of said fluid and attendant increase of fluid pressure in said high pressure portion.

2. The pressure control device recited in claim 1 wherein said biasing means is a mechanical spring.

3. The pressure control device recited in claim 1 wherein said biasing means is a fluid spring.

4. The pressure control device recited in claim 1 wherein said biasing means is a fluid pressure biasing means.

5. The pressure control device recited in claim 1 wherein said biasing means is a resilient member.

6. The pressure control device recited in claim 1 wherein said pressure control device is in said housing means.

7. The pressure control device recited in claim 1 wherein said pressure control device is in said spindle means.

8. The pressure control device recited in claim 1 and having positioning means for preloading said biasing means.

9. The pressure control device recited in claim 1 and having vent means in communication with said cavity means and the atmosphere.

10. The pressure control device recited in claim 1 and having vent means in communication with said cavity means and said low pressure portion.

References Cited by the Examiner
UNITED STATES PATENTS

| | | | |
|---|---|---|---|
| 1,610,405 | 12/1926 | Wingquist | 192—58 |
| 2,900,811 | 8/1959 | De Selms | 64—28 |
| 3,116,617 | 1/1964 | Skoog | 64—26 |
| 3,145,662 | 8/1964 | Eickmann | 103—223 |
| 3,210,960 | 11/1965 | Vaughn | 64—26 |

FRED C. MATTERN, Jr., *Primary Examiner.*

HALL C. COE, *Examiner.*